United States Patent
Lopez

(10) Patent No.: US 7,246,784 B1
(45) Date of Patent: Jul. 24, 2007

(54) SPRING-LOADED SHELF FOR A COOLER

(76) Inventor: Hector Lopez, P.O. Box 714, East Chicago, IN (US) 46312

( * ) Notice: Subject to any disclaimer, the term of this patent is extended or adjusted under 35 U.S.C. 154(b) by 0 days.

(21) Appl. No.: 10/992,542

(22) Filed: Nov. 18, 2004

(51) Int. Cl.
F16M 13/00 (2006.01)

(52) U.S. Cl. ............... 248/588; 248/188.1; 248/188.2; 248/188.3; 248/188.6; 248/188.7; 248/164; 248/165; 248/166; 248/169; 248/171; 248/432; 248/436; 248/584; 248/585; 108/145; 108/147; 254/122; 254/7 C; 254/9 C

(58) Field of Classification Search ............... 248/164, 248/188.1, 188.2, 188.3, 188.6, 166, 188.7, 248/165, 169, 171, 436, 588, 584, 585; 108/145, 108/147; 254/122, 7 C, 9 C
See application file for complete search history.

(56) References Cited

U.S. PATENT DOCUMENTS

| 3,410,328 | A | * | 11/1968 | Sasai ............................ 220/9.2 |
| 4,032,103 | A | * | 6/1977 | Ehrichs ........................ 248/421 |
| 4,405,116 | A | * | 9/1983 | Eisenberg ..................... 254/122 |
| 4,558,648 | A | * | 12/1985 | Franklin et al. ............. 108/147 |
| 4,577,821 | A | * | 3/1986 | Edmo et al. ................. 108/145 |
| 4,753,419 | A | * | 6/1988 | Johansson .................... 254/122 |
| 5,192,053 | A | * | 3/1993 | Sehlstedt ...................... 254/122 |
| 5,299,906 | A | * | 4/1994 | Stone .......................... 187/275 |
| 5,605,056 | A | | 2/1997 | Brown ........................ 62/457.4 |
| 5,722,513 | A | * | 3/1998 | Rowan et al. ............... 187/269 |
| 5,771,816 | A | * | 6/1998 | Zaguroli, Jr. ................ 108/147 |
| 5,833,198 | A | * | 11/1998 | Graetz .......................... 248/370 |
| 5,957,426 | A | * | 9/1999 | Brodersen .................... 248/588 |
| 6,056,459 | A | * | 5/2000 | Tsai ............................. 400/496 |
| 6,269,965 | B1 | | 8/2001 | White .................... 220/592.18 |
| 6,336,627 | B1 | * | 1/2002 | Fujita et al. ................. 267/131 |
| 6,427,607 | B1 | * | 8/2002 | Palmer ......................... 108/43 |
| 6,705,238 | B1 | * | 3/2004 | Heckert ....................... 108/145 |
| 7,048,236 | B2 | * | 5/2006 | Benden et al. .............. 248/121 |

* cited by examiner

Primary Examiner—Cari D. Friedman
Assistant Examiner—Todd M. Epps
(74) Attorney, Agent, or Firm—Goldstein Law Offices, P.C.

(57) ABSTRACT

A spring-loaded shelf for an existing beverage cooler, which obviates the need for a user to reach more deeply within the confines of the cooler for a beverage as the contents of the cooler become depleted. The spring-loaded shelf has a base, a platform pivotally attached to the base by two scissor-type linkages, and a lifting mechanism for selectively and automatically raising the platform with respect to the base upon the scissor-type linkages, as the weight of the beverages placed upon the platform gradually decreases. Use of the spring-loaded shelf prevents injury to the user while retrieving a beverage from the cooler, and also provides for increased accessibility and visibility of the contents of the cooler.

6 Claims, 2 Drawing Sheets

SPRING-LOADED SHELF FOR A COOLER

BACKGROUND OF THE INVENTION

1. Field of the Invention

The invention generally relates to an accessory for an existing cooler, and in particular relates to a spring-loaded shelf which is selectively positioned within an existing beverage cooler, having a platform which gradually vertically rises as beverages are removed therefrom, thereby obviating the need for a user to reach deeply within the confines of the cooler in order to retrieve a beverage.

2. Description of the Related Art

Top-loading beverage coolers are used by various business establishments for storing bottled and canned beverages, and for maintaining the beverages at low temperatures. While top-loading coolers are extremely useful for storing beverages until they are needed, they have a notable drawback. In particular, as the contents of the top-loading cooler become depleted, it becomes increasingly necessary for a user to reach deeply within the confines of the cooler to retrieve a beverage therefrom, which may strain the shoulder, arm, and stomach muscles of the user. Moreover, the user may accidentally cut his/her hand upon a broken bottle that may be resting, unseen, at the bottom of the cooler. Accordingly, there is a need for a spring-loaded shelf which is selectively positioned within an existing top-loading beverage cooler, having a platform which gradually vertically rises as beverages are removed therefrom, thereby obviating the need for a user to reach more deeply within the confines of the cooler for a beverage as the contents become depleted, and thereby preventing straining the muscles of the user or otherwise injuring the user.

A variety of coolers and cooler accessories have been devised. For example, U.S. Pat. No. 6,269,965 to White appears to show a cooler insert for an existing portable cooler or ice chest, having a platform with apertures for supporting flanged food receptacles by their upper flanges, in order to present the contents of the receptacles for better visibility and accessibility to the public. Moreover, U.S. Pat. No. 5,605,056 to Brown et al appears to show a portable cooler with a suspended grate for ice-free storage areas.

In addition, various lifts have been devised for selectively raising an object that has been placed thereupon. For example, U.S. Pat. No. 5,722,513 to Rowan appears to show a scissor lift having a pair of leg assemblies pivotally connected to a base, wherein relative movement between the legs and the base is opposed by spring assemblies that may be selectively connected to the carriage to vary the bias on the legs. What's more, U.S. Pat. No. 5,771,816 to Zaguroli, Jr. appears to show a lift table having an air actuator bellows for raising and lowering a load platform with a scissors linkage.

While these devices may be suitable for the particular purpose employed, or for general use, they would not be as suitable for the purposes of the present invention as disclosed hereafter.

SUMMARY OF THE INVENTION

It is an object of the invention to provide a spring-loaded shelf for a top-loading cooler, which obviates the need for a user to reach more deeply within the confines of the cooler as the items contained therein become depleted, and thereby prevents straining the muscles of the user or otherwise injuring the user. Accordingly, the spring-loaded shelf has a base, a platform pivotally attached to the base by two scissor-type linkages, and a lifting mechanism for selectively raising the platform with respect to the base upon the scissor-type linkages as the weight of items upon the platform gradually decreases, and thereby prevents straining the muscles of the user or otherwise injuring the user.

Further objects of the invention will become apparent in the detailed description of the invention that follows.

The invention is a spring-loaded shelf for an existing beverage cooler, which obviates the need for a user to reach more deeply within the confines of the cooler for a beverage as the contents of the cooler become depleted. The spring-loaded shelf has a base, a platform pivotally attached to the base by two scissor-type linkages, and a lifting mechanism for selectively and automatically raising the platform with respect to the base upon the scissor-type linkages, as the weight of the beverages placed upon the platform gradually decreases. Use of the spring-loaded shelf prevents straining the muscles of the user or otherwise injuring the user while retrieving a beverage from the cooler, and also provides for increased accessibility and visibility of the contents of the cooler.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
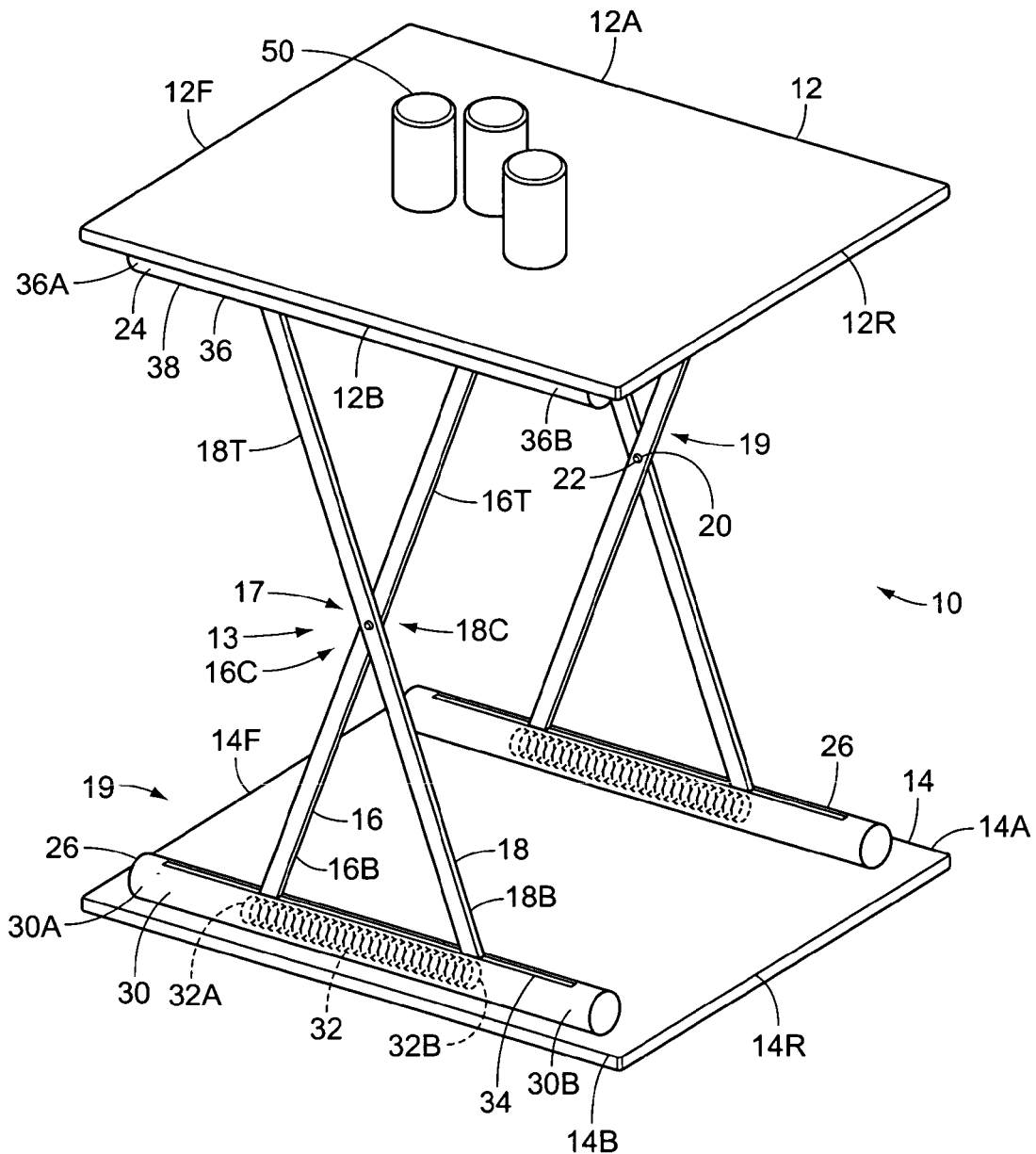
FIG. 1 is a perspective view of a spring-loaded shelf in a substantially extended position.

FIG. 1 illustrates a spring-loaded shelf 10 for an existing beverage cooler, having a platform which gradually vertically rises as weighted items such as beverage containers are selectively removed therefrom, thereby obviating the need for a user to reach deeply within the confines of the cooler in order to retrieve one of said items as the cooler empties. The spring-loaded shelf 10 generally comprises a base 14, the platform 12 pivotally attached to the base 14 by two scissor-type linkages 13, and a lifting mechanism 19 for automatically raising the platform 12 with respect to the base 14 upon the scissor-type linkages 13 as weighted items such as beverages are removed therefrom, thereby preventing straining the muscles of the user or otherwise injuring the user while retrieving one of said items from the cooler. In FIG. 1, several beverage containers 50 are positioned upon the platform 12. The spring-loaded shelf 10 will now be described in detail.

The substantially rectangular platform 12 overlays the base 14. The platform 12 has a first lateral side 12A, a second lateral side 12B, a third side 12F, and a fourth side 12R. Similarly, the base 14 has a first lateral side 14A, a second lateral side 14B, a third side 14F, and a fourth side 14R. One of the scissor-type linkages 13 extends between the first lateral side 12A of the platform 12 and the first lateral side 14A of the base 14. The other scissor-type linkage 13 extends between the second lateral side 12B of the platform 12 and the second lateral side 14B of the base 14. Each scissor-type linkage 13 is substantially identical, and comprises a first arm 16 and a second arm 18. Accordingly, a description of either scissor-type linkage 13 will suffice as a description of the other.

Figure 2:
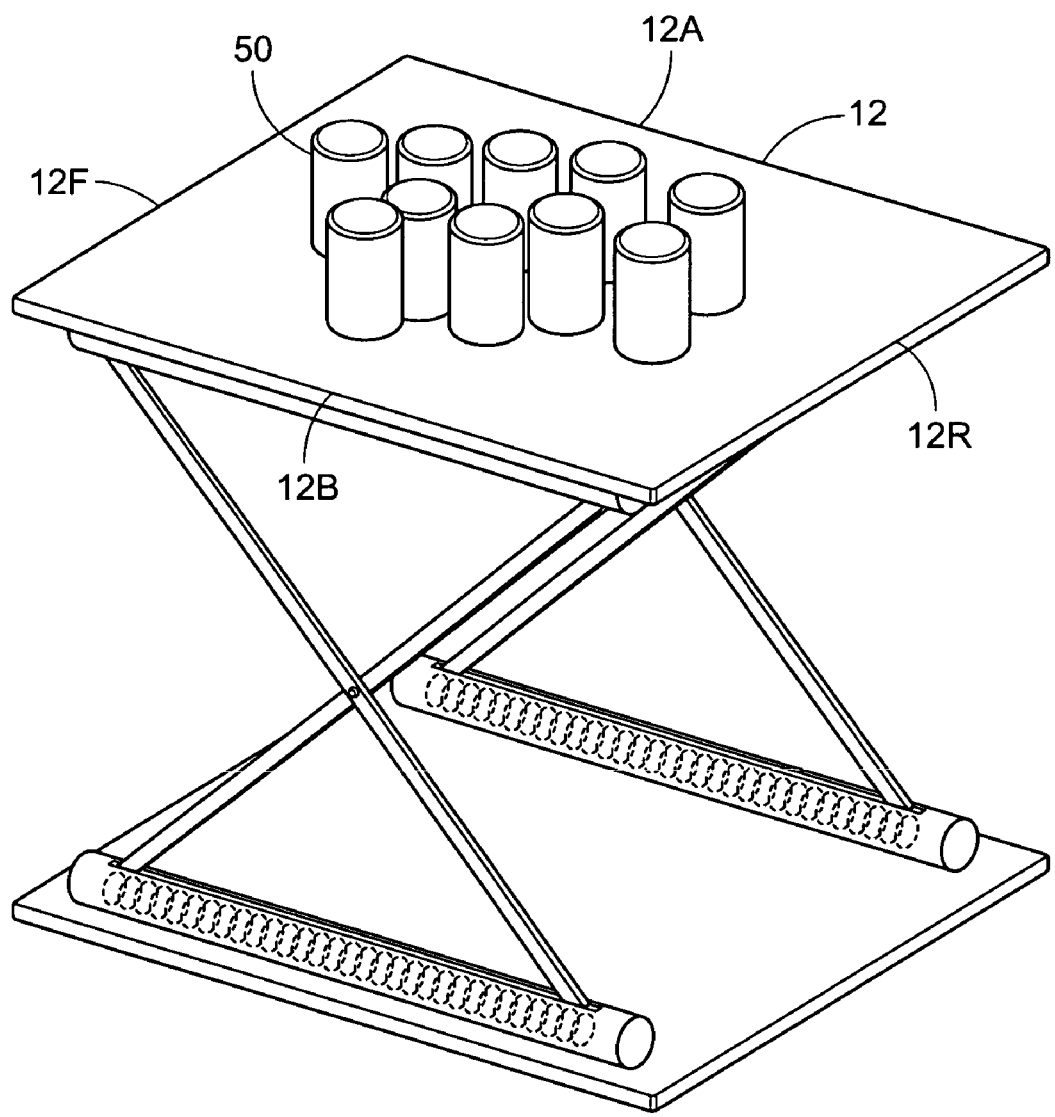
FIG. 2 is a perspective view of the spring-loaded shelf in a partially retracted position.

The first arm 16 of each linkage 13 has a top 16T, a bottom 16B, and a center 16C. In like fashion, the second arm 18 of each linkage 13 has a top 18T, a bottom 18B, and a center 18C. The center 16C of the first arm 16 is pivotally attached to the center 18C of the second arm 18 at a hinged junction 17. Each hinged junction 17 comprises a hinge pin 22 extending through an opening 20. The spring-loaded shelf 10 has a fully extended position wherein the platform 12 is maximally separated from the base 12, and has a fully retracted position wherein the platform 12 is most proximal to the base 12. Additionally, the spring-loaded shelf 10 has a spectrum of positions intermediate between the fully extended position and the fully retracted position. FIG. 1 illustrates the spring-loaded shelf 10 in a substantially extended position. FIG. 2 illustrates the spring-loaded shelf 10, as in FIG. 1, except that several more beverage containers 50 have been positioned upon the platform 12, thereby causing the spring-loaded shelf 10 to be in one of the partially retracted positions.

The lifting mechanism 19 comprises two spring assemblies 26 and two cylindrical tracks 24. One of the spring assemblies 26 is substantially parallel to and positioned in proximity to the first lateral side 14A of the base 14. The other spring assembly 26 is substantially parallel to and positioned in proximity to the second lateral side 14B of the base 14.

Correspondingly, one of the cylindrical tracks 24 is substantially parallel to and positioned in proximity to the first lateral side 12A of the platform 12, and hence overlays one of the two spring assemblies 26. The other cylindrical track 24 is substantially parallel to and positioned in proximity to the second lateral side 12B of the platform 12, and hence overlays the other spring assembly 26.

Each of the two spring assemblies 26 is substantially identical. Moreover, each of the two cylindrical tracks 24 is substantially identical. Accordingly, a description of one of the two spring assemblies 26, and the cylindrical track 24 which overlays said spring assembly 26, will suffice as a description of the other spring assembly 26, and the cylindrical track 24 which overlays said other spring assembly 26.

Each spring assembly 26 comprises a substantially cylindrical spring housing 30 having a first end 30A and a second end 30B. The spring housing 30 has a longitudinal slot 34 that extends substantially from the first end 30A of the spring housing 30 to the second end 30B of the spring housing 30. Each of the spring housings 30 contains a coiled spring 32 having a first end 32A and a second end 32B.

Each cylindrical track 24 comprises a track housing 36 having a first end 36A and a second end 36B. The track housings 36 each have a track slot 38 that extends substantially from the first end 36A of the cylindrical track 24 to the second end 36B of the cylindrical track 24.

The top 16T of the first arm 16 is slidably mounted to the platform 12 by the cylindrical track 24, and selectively slides within the track slot 38 thereof, when the platform 12 is selectively raised by the lifting mechanism 19. The bottom 16B of the first arm 16 is slidably mounted to the base 14 by the spring assembly 26. More particularly, the bottom 16B of the first arm 16 is mechanically linked to the first end 32A of the coiled spring 32.

The top 18T of the second arm 18 is also slidably mounted to the platform 12 by the cylindrical track 24, and selectively slides within the track slot 38 thereof, when the platform 12 is selectively raised by the lifting mechanism 19. The bottom 18B of the second arm 18 is mechanically linked to the second end 32B of the coiled spring 32. The top 16T of the first arm 16 is slidably mounted to the platform 12 at a location along the cylindrical track 24 which is at all times more proximal to the second end 36B of the track housing 36 than is the top 18T of the second arm 18.

The center 16C of the first arm 16 is pivotally attached to the center 18C of the second arm 18 at the hinged junction 17.

The hinged junctions 17, the spring assemblies 26, and the cylindrical tracks 24 together allow the spring-loaded shelf 10 to be facilely inter-converted between the extended position and the retracted position as items are selectively placed upon or removed from the platform 12, as will now be described.

The coiled spring 32 has a stretched conformation and an equilibrium un-stretched conformation. When a user places a weighted item such as a beverage container upon the platform 12, the weight of the item exerts a downward force upon the arms, 16 and 18. The downward force causes the bottom 16B of the first arm 16 to slide towards the first end 30A of the spring housing 30 within the longitudinal slot 34, and causes the bottom 18B of the second arm 18 to slide towards the second end 30B of the spring housing 30, also within the longitudinal slot 34. Simultaneously, the top 16T of the first arm 16 slides towards the second end 24B of the cylindrical track 24 within the track slot 38, and the top 18T of the second arm 18 slides towards the first end 24A of the cylindrical track 24, also within the track slot 38. Simultaneously, the coiled spring 32 is converted to the stretched conformation.

As weighted items are selectively removed from the platform 12, the spring 32 gradually returns to the equilibrium un-stretched conformation and simultaneously biases the arms, 16 and 18, of the spring-loaded shelf 10 to return to the extended position wherein the platform 12 is maximally vertically displaced from the base 14, thereby causing any remaining items present upon the platform 12 to vertically rise within the cooler, thereby allowing the user to retrieve one or more of said items without having to reach deep within the cooler, and thereby preventing straining the muscles of or otherwise injuring the user.

The platform 12 and the base 14 are preferably constructed from a durable plastic, and are approximately twenty inches in length and nine inches in width. While being deployed and in the fully retracted position, the platform 12 is approximately several inches above the bottom of the cooler. In the fully extended position, the platform 12 is proximal to the top of the cooler. Although, as described, the spring-loaded shelf 10 is used in conjunction with an existing top-loaded beverage cooler, it is equally well suited for use in conjunction with coolers designed for storage of any number of different food items.

In use, a user positions the base 14 of the spring-loaded shelf 10 upon the bottom of an existing cooler, and places a plurality of items such as beverage containers upon the platform 12, thereby causing the platform 12 to vertically lower towards the bottom of the cooler. The extent of the lowering will, of course, depend on the weight of the items placed upon the platform 12. As the weighted items are selectively removed by the user from the platform 12, the tension in the spring 32 biases the spring-loaded shelf 10 to the extended position wherein the platform 12 is maximally vertically displaced from the base 14, thereby causing any remaining items present upon the platform 12 to vertically rise within the cooler, thereby allowing the user to retrieve one or more of said items without having to reach deep within the cooler, and thereby preventing straining the muscles of the user.

In conclusion, herein is presented a spring-loaded shelf for an existing beverage cooler, having a platform that gradually vertically rises as beverages are removed therefrom, thereby obviating the need for a user to reach deeply within the confines of the cooler in order to retrieve a beverage. The invention is illustrated by example in the drawing figures, and throughout the written description. It should be understood that numerous variations are possible, while adhering to the inventive concept. Such variations are contemplated as being a part of the present invention.

What is claimed is:

1. A spring-loaded shelf for an existing cooler used for storing a plurality of items, for selectively raising said items as the cooler becomes emptied of the items, so that a user may retrieve one of said items without reaching deeply within the confines of the cooler, said spring-loaded shelf comprising:
   a base having a first lateral side, a second lateral side, a third side, and a fourth side;
   a platform which overlays the base, said platform having a first lateral side, a second lateral side, a third lateral side, and a fourth side, said platform for supporting said items;
   two scissor-type linkages which pivotally attach the platform to the base, each scissor-type linkage comprising a first arm and a second arm, each having a top, a bottom, and a center, wherein the top of each arm is slidably mounted to the platform, the bottom of each arm is slidably mounted to the base, and the center of the first arm is pivotally attached to the center of the second arm at a hinged junction; and
   a lifting mechanism having two spring assemblies and two tracks for automatically raising the platform with respect to the base upon the scissor-type linkages as said items are selectively removed therefrom, thereby obviating the need for a user to reach deeply within the confines of the cooler in order to retrieve one of said items.

2. The spring-loaded shelf as recited in claim 1, wherein each spring assembly comprises a spring housing having a first end, a second end, and a longitudinal slot that extends substantially from the first end to the second end of the spring housing, and wherein the spring housing contains a coiled spring having a first end, a second end, a stretched conformation, and an equilibrium un-stretched conformation, wherein when items are placed upon the platform, this exerts a downward force upon the arms, thereby causing the bottom of the first arm and the bottom of the second arm to slide within the longitudinal slot and to simultaneously convert the coiled spring to the stretched conformation, and wherein, simultaneously, the top of the first arm and the top of the second arm slide within the track slot of the track; and wherein as items are removed from the platform, the spring returns to the equilibrium un-stretched conformation and simultaneously raises the platform above the base, thereby causing any remaining items present upon the platform to vertically rise within the cooler.

3. The spring-loaded shelf as recited in claim 2, wherein each track comprises a track housing having a first end and a second end, each of said track housings having a track slot that extends substantially from the first end of the track to the second end of the track.

4. The spring-loaded shelf as recited in claim 3, wherein the top of the first arm and the top f the second arm are slidably mounted to the platform by the cylindrical track, and selectively slide within the track slot thereof, when the platform is selectively raised by the lifting mechanism, wherein the bottom of the first arm is mechanically linked to the first end of the coiled spring of the spring assembly, and therein the bottom of the second arm is mechanically linked to the second end of the coiled spring of the spring assembly.

5. The spring-loaded shelf as recited in claim 4, wherein one of the spring assemblies is substantially parallel to and positioned in proximity to the first lateral side of the base, wherein the other spring assembly is substantially parallel to and positioned in proximity to the second lateral side of the base, wherein one of the cylindrical tracks is substantially parallel to and positioned in proximity to the first lateral side of the platform, and hence overlays one of the two spring assemblies, and wherein the other cylindrical track is substantially parallel to and positioned in proximity to the second lateral side of the platform, and hence overlays the other spring assembly, wherein one of the scissor-type linkages extends between the first lateral side of the platform and the first lateral side of the base, and wherein the other scissor-type linkage extends between the second lateral side of the platform and the second lateral side of the base.

6. A method for enabling a user to retrieve an item from an existing cooler without reaching deeply within the confines of the cooler, even as the cooler becomes progressively depleted of its contents, said method also for providing increased accessibility and visibility of the items within the cooler, said method using a spring-loaded shelf having a base, a platform pivotally attached to the base by two scissor-type linkages, and a lifting mechanism having a coiled spring having an equilibrium un-stretched conformation and also a stretched conformation, said lifting mechanism for selectively raising the platform with respect to the base upon the scissor-type linkages as the weight exerted upon the platform gradually decreases, said method comprising the steps of:
   positioning the base of the spring-loaded shelf upon the bottom of the cooler;
   placing a plurality of items upon the platform, thereby causing the platform to vertically lower towards the bottom of the cooler while simultaneously converting the spring to the stretched conformation; and
   raising the platform by removing items from the platform, thereby allowing the coiled spring to return to the un-stretched equilibrium conformation while simultaneously causing the platform and the items placed upon the platform to vertically rise, thereby allowing the user to retrieve one or more of said items without having to reach deep within the cooler.

* * * * *